May 7, 1940.  J. BERNSTEIN  2,199,737
TANK MOUNTING
Filed Aug. 28, 1939
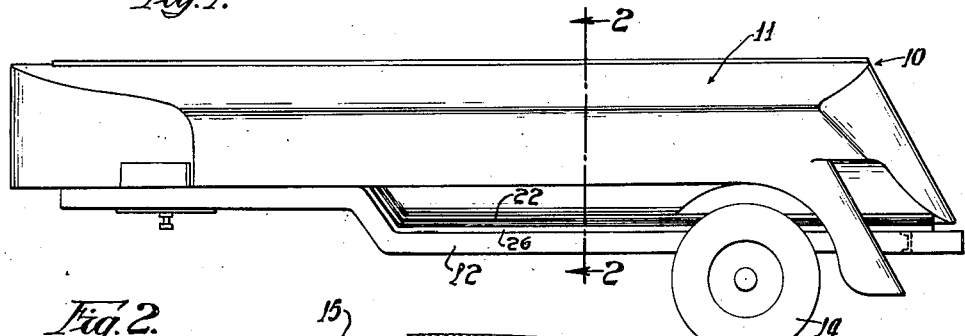
Fig. 1.
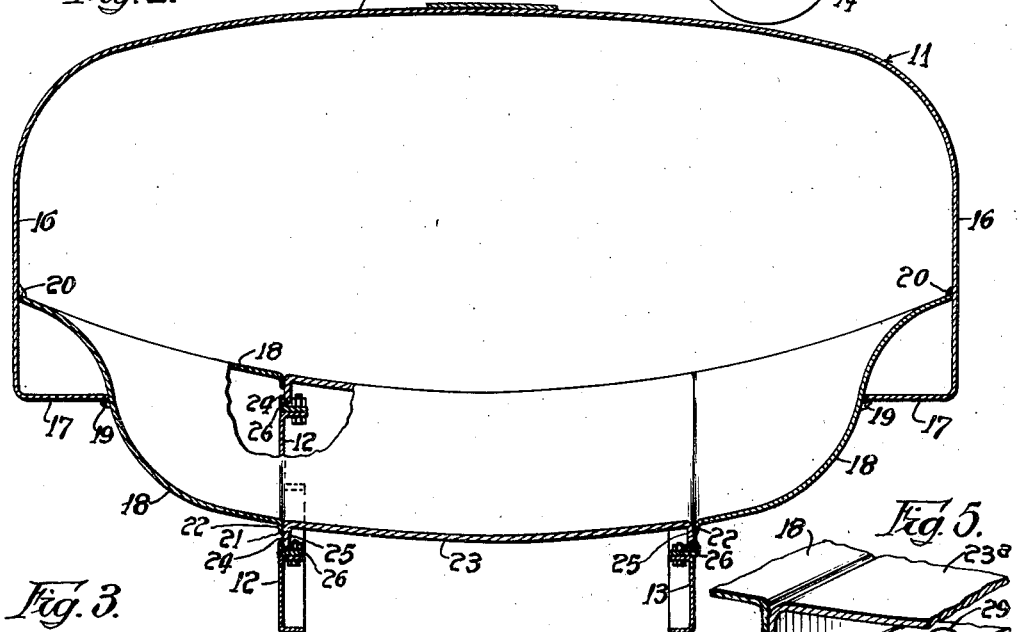
Fig. 2.
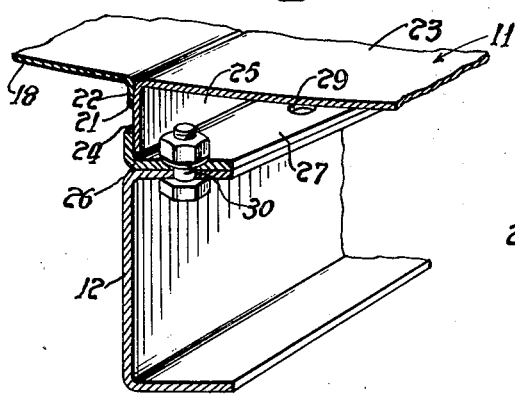
Fig. 3.
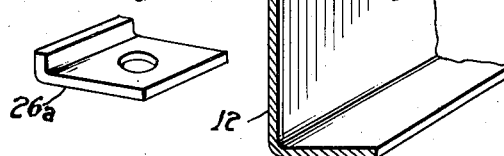
Fig. 4.
Fig. 5.
Witness:
E. Camporini
Inventor:
Jacob Bernstein,
By Bair & Freeman
Attorneys.

Patented May 7, 1940

2,199,737

UNITED STATES PATENT OFFICE 2,199,737

TANK MOUNTING

Jacob Bernstein, Omaha, Nebr.

Application August 28, 1939, Serial No. 292,309

2 Claims. (Cl. 280—5)

This invention relates to improvements in tank mountings and includes simple and inexpensively fabricated means for securing them to a supporting member such as a trailer chassis.

One of the objects of the invention is to secure a transport tank or the like upon a chassis of a vehicle in such manner as to more evenly distribute the stresses imposed therebetween in the transportation of fluids in the tank.

Another object of the invention is to secure a tank upon the longitudinally extending sills of a vehicle chassis by means of extensions integral with and extending downwardly from parts of the tank such as a belly sheet thereof.

Another important object of the invention is to provide means whereby warping of the tank shell due to heat applied thereto in the process of welding portions thereof together and the corresponding cracking of the metal of the shell thereby is entirely eliminated.

A further object of the invention is to provide, in a metal tank especially adapted for the transportation of fluids, a central portion of the bottom provided with integral depending extensions which may be secured to the sills of a vehicle chassis and means for securing side portions of the bottom to the depending extensions by exterior welded joints.

Still another object is to provide in a welded tank, means whereby portions thereof not affected by the effects of welding absorb the stresses developed in transporting heavy loads of fluid in the tank.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of an improved tank built in accordance with my invention and mounted upon a trailer chassis.

Figure 2 is a vertical section taken on the line 2—2 of Figure 1 and is on an enlarged scale.

Figure 3 is a detail fragmentary perspective view of the tank shell secured to a sill member of the chassis.

Figure 4 is a detail perspective of a modified form of fastening means; and

Figure 5 is a detail perspective view similar to Figure 3 of a further modified form the invention may take.

Referring now in detail to the embodiments of the invention illustrated in Figures 1, 2 and 3 of the drawing in which like numerals are used to indicate identical parts throughout, the numeral 10 indicates generally a vehicle in the form of a trailer upon which my improved tank 11 has been mounted. The trailer 10 includes the usual vehicle chassis sills 12 and 13 of channel shaped cross section and is provided in a conventional manner with a plurality of wheels 14, only one of which appears in Figure 1. The tank 11 consists of a metal top sheet 15 having side extensions 16 integral therewith. The lowermost ends 17 of the side extensions 16 are bent inwardly to contact central portions of longitudinally extending curved corner plates 18 and are secured thereto by means of welding 19. Another line of welding 20 secures the upper and outer ends of the members 18 to the side extensions 16 within the tank 11.

The lowermost extremities of the corner plates 18 are provided with downwardly extending flanges 22. A belly sheet 23 is provided with downwardly extending flanges 25 similar to but of a somewhat greater width than the flanges 22. The flanges 22 abut and are seam welded as at 21 along their edges to the sides of the flanges 25.

Angle bars 26 of substantially the same length and shape as the chassis sills 12 and 13 are also longitudinally welded as at 24 to each flange 25. The horizontal flanges 27 of the angle bars 26 are secured to the upper flanges of the sills 12 and 13 as by means of bolts 28 through corresponding openings 29 and 30 in the flanges and sills respectively.

In Figure 4 is illustrated a short piece of angle bar 26a, a plurality of which may be welded at longitudinally spaced points to the flanges 25 and then bolted, riveted or otherwise suitably secured to the sills 12 and 13. A plurality of the angle bars 26a may be used instead of the single angle bar 26 if desired.

Figure 5 illustrates another modified form of my invention in which a belly sheet 23a is provided with vertically depending flanges 25a having horizontally extending flanges 27a for securing them to the sill members 12 and 13.

In transporting heavy loads such as fluids the gravity load is evenly distributed through a compression of the flanges 25 over the full length of the sills. The longitudinally extending welds 21 and 24 form a rigid support for the tank that is more desirable than constructions now in use due to the fact that portions thereof which may be damaged through excessive heat due to welding operations are under compression. With my construction, the bends in the plates 23 and 18 to form the flanges 22 and 25 eliminate cracking of the plates at a point where, in usual constructions, welded joints are present and weaken the structure along the point of support where it should be strongest. The tank is of a more simplified yet more durable construction and therefore may be more efficiently manufactured and sold at a lower cost and will give service long beyond the usual life of transport tanks.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A tank structure having a top sheet, side extensions depending therefrom, corner plates having downwardly extending flanges along their lower edges, said corner plate being secured along their upper edges to said side extensions, a belly plate provided with longitudinally extending flanges secured to said downwardly extending flanges of said corner plates, and means for securing said belly plate to the sills of a vehicle chassis.

2. A transport tank having a top sheet, side extensions depending therefrom, corner plates having downwardly extending flanges along their lower edges, said corner plates being secured along their upper edges to said side extensions, a belly plate provided with longitudinal downwardly extending flanges secured to said downwardly extending flanges of the corner plates, and angle bars welded to a plurality of said flanges for securing said belly plate to the sills of a vehicle chassis.

JACOB BERNSTEIN.